(12) United States Patent
Bian (10) Patent No.: US 12,092,868 B2
(45) Date of Patent: Sep. 17, 2024

(54) PHOTONICS CHIPS WITH RETICLE STITCHING BY SIDE-BY-SIDE TAPERED SECTIONS

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 220 days.

(21) Appl. No.: 17/835,513

(22) Filed: Jun. 8, 2022

(65) Prior Publication Data

US 2023/0400633 A1    Dec. 14, 2023

(51) Int. Cl.
  *G02B 6/12*    (2006.01)
  *G02B 6/122*   (2006.01)
  *G02B 6/13*    (2006.01)

(52) U.S. Cl.
  CPC .......... *G02B 6/1228* (2013.01); *G02B 6/13* (2013.01); *G02B 2006/12061* (2013.01)

(58) Field of Classification Search
  CPC ...... G02B 6/1228; G02B 6/13; G02B 6/2821; G02B 6/12004; G02B 2006/12061
  USPC ............................... 385/39, 43, 50, 129–132
  See application file for complete search history.

(56) References Cited

U.S. PATENT DOCUMENTS

| | | | | |
|---|---|---|---|---|
| 9,726,821 | B2* | 8/2017 | Murray | G02B 6/4212 |
| 10,816,726 | B1 | 10/2020 | Peng et al. | |
| 11,808,995 | B2* | 11/2023 | Bian | G02B 6/1228 |
| 2021/0278611 | A1 | 9/2021 | Sahin et al. | |
| 2022/0043207 | A1 | 2/2022 | Bian | |
| 2022/0128763 | A1* | 4/2022 | Shih | G02B 6/1228 |

OTHER PUBLICATIONS

Tae Joon Seok, Kyungmok Kwon, Johannes Henriksson, Jianheng Luo, and Ming C. Wu, "Wafer-scale silicon photonic switches beyond die size limit," Optica 6, 490-494 (2019).
Y. Zhang, K. Shang, Y. Zhang and S. J. Ben Yoo, "Low-Loss Wafer-Scale Silicon Photonic Interposer Utilizing Inverse-Taper Coupler," 2018 IEEE Photonics Conference (IPC), pp. 1-2, doi: 10.1109/IPCon.2018.8527256 (2018).

(Continued)

*Primary Examiner* — Jerry M Blevins
(74) *Attorney, Agent, or Firm* — Thompson Hine LLP; Anthony Canale (57) ABSTRACT

Structures including a waveguide core and methods of fabricating a structure including a waveguide core. The structure comprises a photonics chip including a first chip region, a first waveguide core in the first chip region, a second chip region, and a second waveguide core in the second chip region. The first chip region adjoins the second chip region along a boundary, the first waveguide core includes a first tapered section and the second waveguide core includes a second tapered section adjacent to the first tapered section. The first tapered section has a first longitudinal axis aligned substantially parallel to the boundary, and the second tapered section has a second longitudinal axis aligned substantially parallel to the boundary.

20 Claims, 5 Drawing Sheets

(56) References Cited

OTHER PUBLICATIONS

Richard J. Boiko et al., "Electron beam lithography writing strategies for low loss, high confinement silicon optical waveguides,"; Journal of Vacuum Science & Technology, vol. 29, Issue 6, 06F309; https://doi.prg/10.1116/1.3653266 (Oct. 25, 2011).

W. D. Sacher et al., "Monolithically Integrated Multilayer Silicon Nitride on-Silicon Waveguide Platforms for 3-D Photonic Circuits and Devices," in Proceedings of the IEEE, vol. 106, No. 12, pp. 2232-2245, Dec. 2018, doi: 10.1109/JPROC.2018.2860994 (Dec. 2018).

Han Yun, Wei Shi, Yun Wang, Lukas Chrostowski, and Nicolas A. F. Jaeger "2×2 adiabatic 3-dB coupler on silicon-on-insulator rib waveguides", Proc. SPIE 8915, Photonics North 2013, 89150V; https://doi.org/10.1117/12.2037968 (Oct. 11, 2013).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al., "45nm CMOS - Silicon Photonics Monolithic Technology (45CLO) for next-generation, low power and high speed optical interconnects," in Optical Fiber Communication Conference (OFC), OSA Technical Digest (Optica Publishing Group, 2020), paper T3H.3 (2020).

B. Peng et al., "A CMOS Compatible Monolithic Fiber Attach Solution with Reliable Performance and Self-alignment," In Optical Fiber Communication Conference (OFC), OSA Technical Digest (Optica Publishing Group, 2020), paper Th3l.4 (2020).

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).

Y. Bian et al., "Monolithically integrated silicon nitride platform," 2021 Optical Fiber Communications Conference and Exhibition (OFC), Th1A.46, pp. 1-3 (2021).

A. Aboketaf et al., "Towards fully automated testing and characterization for photonic compact modeling on 300-mm wafer platform," 2021 Optical Fiber Communications Conference and Exhibition (OFC), 2021, pp. 1-3.

Dezfulian, Kevin K. et al., "Hybrid Edge Couplers With Layers in Multiple Levels" filed on Feb. 8, 2021 as a U.S. Appl. No. 17/169,971.

Bartlomiej Jan Pawlak, "Photonics Chips and Semiconductor Products Having Angled Optical Fibers" filed on Oct. 25, 2021 as a U.S. Appl. No. 17/510,329.

Bian, Yusheng, "Edge Couplers With Metamaterial Rib Features" filed on Jul. 7, 2021 as a U.S. Appl. No. 17/369,253.

Bian, Yusheng et al., "Spot-Size Converters With Angled Facets" filed on Feb. 24, 2022 as a U.S. Appl. No. 17/679,188.

Sahin, Asli et al., "Photonics Integrated Circuit With Silicon Nitride Waveguide Edge Coupler" filed on Feb. 19, 2021 as a U.S. Appl. No. 17/179,532.

Bian, Yusheng et al., "Optical Components in the Back-End-Of-Line Stack of a Photonics Chip" filed on Jan. 12, 2021 as a U.S. Appl. No. 17/146,864.

Bian, Yusheng et al., "Edge Couplers in the Back-End-Of-Line Stack of a Photonics Chip" filed on Jan. 19, 2021 as a U.S. Appl. No. 17/151,955.

Bian, Yusheng et al., "Edge Couplers in the Back-End-Of-Line Stack of a Photonic Chip Having a Sealed Cavity" filed on Apr. 11, 2022 as a U.S. Appl. No. 17/658,821.

Bian, Yusheng, "Edge Couplers With Consecutively-Arranged Tapers" filed on Mar. 23, 2022 as a U.S. Appl. No. 17/701,918.

Bian, Yusheng, "Optical Couplers With Diagonal Light Transfer" filed on Nov. 11, 2021 as a U.S. Appl. No. 17/524,218.

* cited by examiner

PHOTONICS CHIPS WITH RETICLE STITCHING BY SIDE-BY-SIDE TAPERED SECTIONS

BACKGROUND

The disclosure relates to photonics chips and, more specifically, to structures including a waveguide core and methods of fabricating a structure including a waveguide core.

Photonics chips are used in many applications and systems including, but not limited to, data communication systems and data computation systems. A photonics chip integrates optical components and electronic components into a unified platform. Among other factors, layout area, cost, and operational overhead may be reduced by the integration of both types of components on the same chip.

A photonics chip may be formed by photolithography in which a repeated reticle image is used in a step-and-repeat lithography tool for patterning the entire photonics chip. Portions of a photoresist layer on a substrate are incrementally exposed to a reticle pattern during patterning until the entire intended area of the photonics chip has been exposed. In this way, a single reticle can be used to create a large pattern of fields containing a repeated reticle pattern that is stitched together. Measures are needed to ensure that light can be efficiently transmitted between waveguide cores across each reticle boundary. Positional mismatches during reticle stitching can lead to misalignment of the waveguide cores at the reticle boundaries, which may result in significant performance degradation such as elevated insertion loss and increased back reflection.

Improved structures including a waveguide core and methods of fabricating a structure including a waveguide core are needed.

SUMMARY

In an embodiment of the invention, a structure comprises a photonics chip including a first chip region, a first waveguide core in the first chip region, a second chip region, and a second waveguide core in the second chip region. The first chip region adjoins the second chip region along a boundary, the first waveguide core includes a first tapered section, and the second waveguide core includes a second tapered section adjacent to the first tapered section. The first tapered section has a first longitudinal axis aligned substantially parallel to the boundary, and the second tapered section has a second longitudinal axis aligned substantially parallel to the boundary.

In an embodiment of the invention, a method comprises forming a first chip region of a photonics chip, and forming a second chip region of the photonics chip that adjoins the first chip region of the photonics chip along a boundary. The first chip region includes a first waveguide core having a first tapered section. The second chip region includes a second waveguide core having a second tapered section positioned adjacent to the first tapered section at the boundary. The first tapered section has a first longitudinal axis aligned substantially parallel to the boundary, and the second tapered section has a second longitudinal axis aligned substantially parallel to the boundary.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
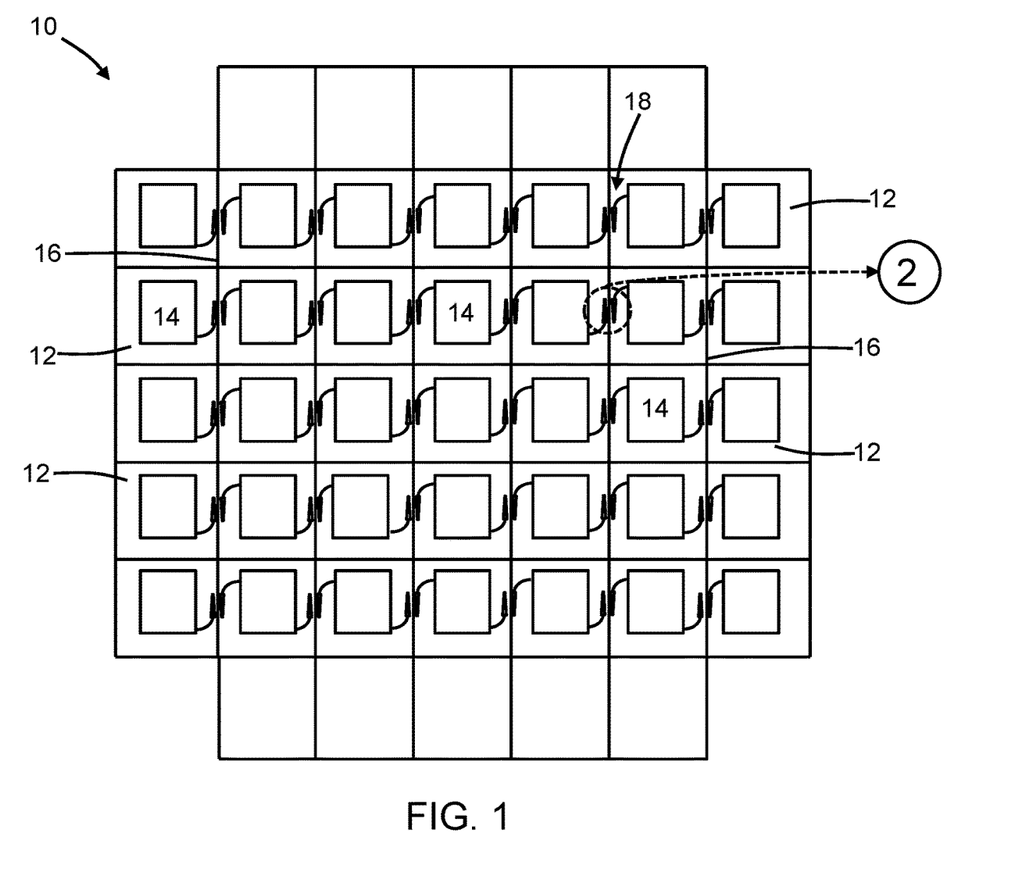
FIG. 1 is a top view of a photonics chip in accordance with embodiments of the invention.
Figure 2:
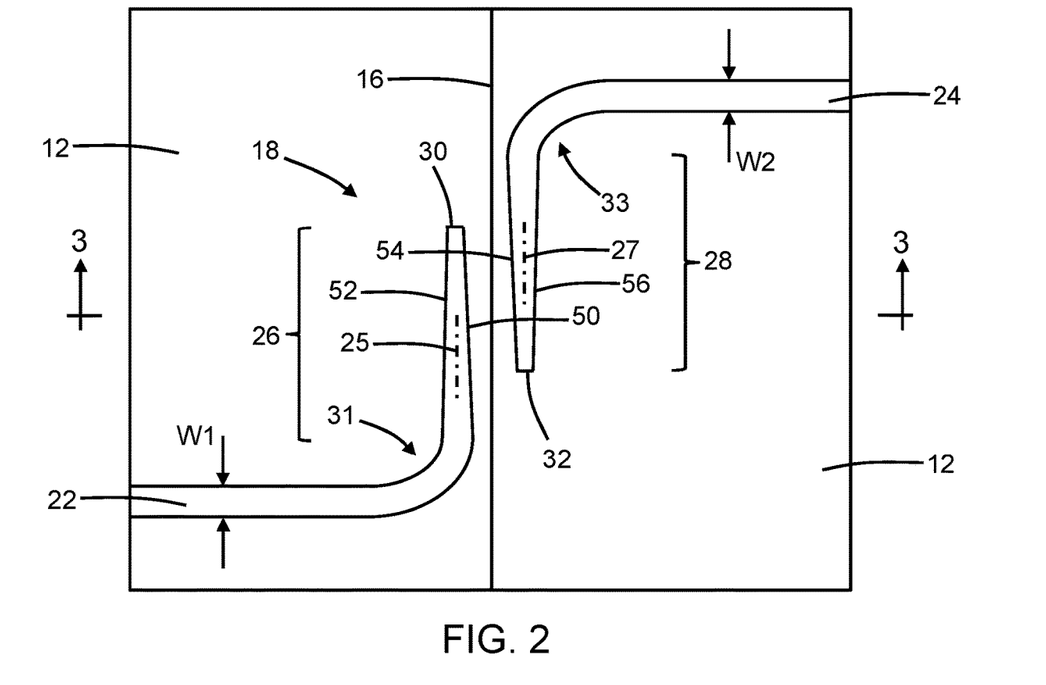
FIG. 2 is an enlarged top view of a portion of FIG. 1.
Figure 3:
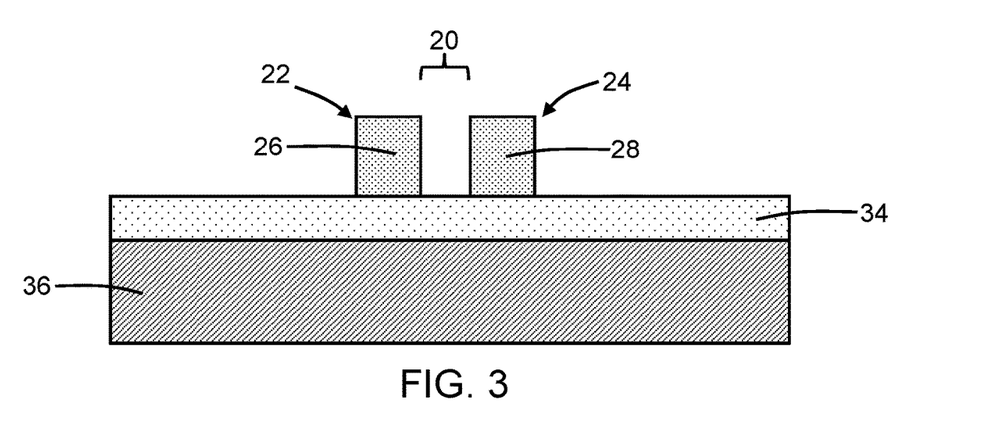
FIG. 3 is a cross-sectional view taken generally along line 3-3 in FIG. 2.

With reference to FIGS. 1, 2, 3 and in accordance with embodiments of the invention, a photonics chip 10 may include multiple chip regions 12 each including optical components, which are generally indicated by reference numeral 14. Adjacent chip regions 12 over the area of the photonics chip 10 adjoin along respective boundaries 16. Structures 18 may be provided at the boundaries 16 to transmit light across the boundaries 16 between optical components 14 on the adjacent chip regions 12. In an embodiment, one of the structures 18 may be provided at each of the boundaries 16 between adjacent pairs of the chip regions 12. In an embodiment, the periodicity of the structures 18 may be equal to the periodicity of the boundaries 16.

Each chip region 12 may be product of a reticle image pattern that is lithographically replicated over the area of the photonics chip 10 as part of the process flow to produce the multiple chip regions 12. The boundaries 16 define transitions between the different chip regions 12. The optical components 14 may include, for example, modulators, splitters, and photodetectors, that provide optical functions and that are connected by waveguide cores. In an embodiment, the optical components 14 in the different chip regions 12 may be identical in type and arrangement.

For each adjacent pair of the chip regions 12, a waveguide core 22 is included in one chip region 12 and a waveguide core 24 is included in the adjacent chip region 12. The waveguide core 22 has a tapered section 26 and the waveguide core 24 has a tapered section 28 that is positioned across the boundary 16 between the adjacent chip regions 12 from the tapered section 26 of the waveguide core 22. Each set of tapered sections 26, 28 defines one of the structures 18. The tapered section 26 has a side-by-side arrangement with the tapered section 28 on the adjacent chip region 12. The waveguide core 22 includes an end 30 that terminates the tapered section 26 and the waveguide core 24 includes an end 32 that terminates the tapered section 28. The end 30 of the waveguide core 22 is longitudinally offset from the end 32 of the waveguide core 24 such that the tapered sections 26, 28 overlap over a distance between the end 30 and the end 32.

The tapered section 26 is aligned along a longitudinal axis 25, and the tapered section 28 is aligned along a longitudinal axis 27. The waveguide core 22 may include a bend 31 that provides a change of direction used to position the tapered section 26 adjacent to the boundary 16 and with the longitudinal axis 25 substantially parallel or parallel to the boundary 16. The waveguide core 24 may include a bend 33 that provides a change of direction used to position the tapered section 28 adjacent to the boundary 16 and with the longitudinal axis 27 substantially parallel or parallel to the boundary 16. In an embodiment, the bend 31 and/or the bend 33 may be 90° bends. The tapered sections 26, 28 are positioned by the bends 31, 33 to provide optical coupling for light transfer in a lateral direction and across the boundary 16 between the adjacent pair of chip regions 12.

The waveguide core 22 has a width dimension W1, and the waveguide core 24 has a width dimension W2. The width dimension W1 of the tapered section 26 of the waveguide core 22 longitudinally decreases with decreasing distance from the terminating end 30. Similarly, the width dimension W2 of the tapered section 28 of the waveguide core 24 longitudinally decreases with decreasing distance from the terminating end 32. The width dimension W1 of the tapered section 26 and the width dimension W2 of the tapered section 28 change in opposite directions relative to each other. In an embodiment, the width dimension W1 of the tapered section 26 and the width dimension W2 of the tapered section 28 may decrease linearly. In an alternative embodiment, the width dimension W1 of the tapered section 26 and the width dimension W2 of the tapered section 28 may decrease based on a non-linear function, such as a quadratic function, a cubic function, a parabolic function, a sine function, a cosine function, a Bezier function, or an exponential function.

The tapered section 26 of the waveguide core 22 is separated from the tapered section 28 of the waveguide core 24 by a gap 20. The tapered section 26 has a sidewall 50 and a sidewall 52 opposite from the sidewall 50, and the waveguide core 24 has a sidewall 54 that is positioned across the gap 20 from the sidewall 50 and a sidewall 56 that is opposite from the sidewall 54. The gap 20 between the tapered section 26 and the tapered section 28 overlaps with the intervening boundary 16 between the adjacent chip regions 12.

The sidewalls 50, 52 intersect the end 30 of the waveguide core 22 and define respective interior angles at the intersection with the end 30. In an embodiment, the respective interior angles between the sidewalls 50, 52 and the end 30 may be equal. In an alternative embodiment, the respective interior angles between the sidewalls 50, 52 and the end 30 may be unequal. The sidewalls 54, 56 meet at the end 32 of the waveguide core 24 and define respective interior angles relative at the intersection with the end 32 and define respective interior angles at the intersection with the end 32. In an embodiment, the respective interior angles between the sidewalls 54, 56 and the end 32 may be equal. In an alternative embodiment, the respective interior angles between the sidewalls 54, 56 and the end 32 may be unequal. In an embodiment, the tapered section 26 and the tapered section 28 may have taper angles equal to the sum of their respective interior angles. In an embodiment, the tapered section 26 and the tapered section 28 may have equal or substantially equal taper angles defining the width change with longitudinal position relative to the terminating ends 30, 32.

In an embodiment, the longitudinal axis 25 of the tapered section 26 may be aligned parallel to the longitudinal axis 27 of the tapered section 28. In an embodiment, the longitudinal axis 25 of the tapered section 26 may be aligned substantially parallel to the longitudinal axis 27 of the tapered section 28. In an embodiment, the longitudinal axis 25 of the tapered section 26 may be aligned parallel to the boundary 16, and the longitudinal axis 27 of the tapered section 28 may also be aligned parallel to the boundary 16. In an embodiment, the longitudinal axis 25 of the tapered section 26 may be aligned substantially parallel to the boundary 16, and the longitudinal axis 27 of the tapered section 28 may also be aligned substantially parallel to the boundary 16.

The waveguide cores 22, 24 may be positioned in a vertical direction over a dielectric layer 34 and a substrate 36. In an embodiment, the dielectric layer 34 may be comprised of a dielectric material, such as silicon dioxide, and the substrate 36 may be comprised of a semiconductor material, such as single-crystal silicon. In an embodiment, the dielectric layer 34 may be a buried oxide layer of a silicon-on-insulator substrate, and the dielectric layer 34 may separate the waveguide cores 22, 24 from the substrate 36. In an alternative embodiment, an additional dielectric layer comprised of, for example, silicon dioxide may separate the waveguide cores 22, 24 from the dielectric layer 34. In an alternative embodiment, the substrate 36 may include an undercut beneath one or more of the tapered sections 26, 28.

In an embodiment, the waveguide cores 22, 24 may be comprised of a material having a refractive index that is greater than the refractive index of silicon dioxide. In an embodiment, the waveguide cores 22, 24 may be comprised of a semiconductor material, such as single-crystal silicon. In an alternative embodiment, the waveguide cores 22, 24 may be comprised of a dielectric material, such as silicon nitride. In an alternative embodiment, the waveguide cores 22, 24 may be comprised of silicon oxynitride. In alternative embodiments, other materials, such as a polymer or a III-V compound semiconductor, may be used to form the waveguide cores 22, 24.

In an embodiment, the waveguide cores 22, 24 may be formed by patterning a layer of material with lithography and etching processes. In an embodiment, the waveguide cores 22, 24 may be formed by patterning a device layer (e.g., single-crystal silicon) of a silicon-on-insulator substrate. In an embodiment, the waveguide cores 22, 24 may be formed by patterning a deposited layer of a material (e.g., silicon nitride). In an embodiment, the tapered sections 26, 28 of the waveguide cores 22, 24 may be solid and continuous (i.e., non-segmented). Each of the chip regions 12 may be provided by a discrete reticle image during lithography and the different reticle images are stitched to form the photonics chip 10.

Figure 4:
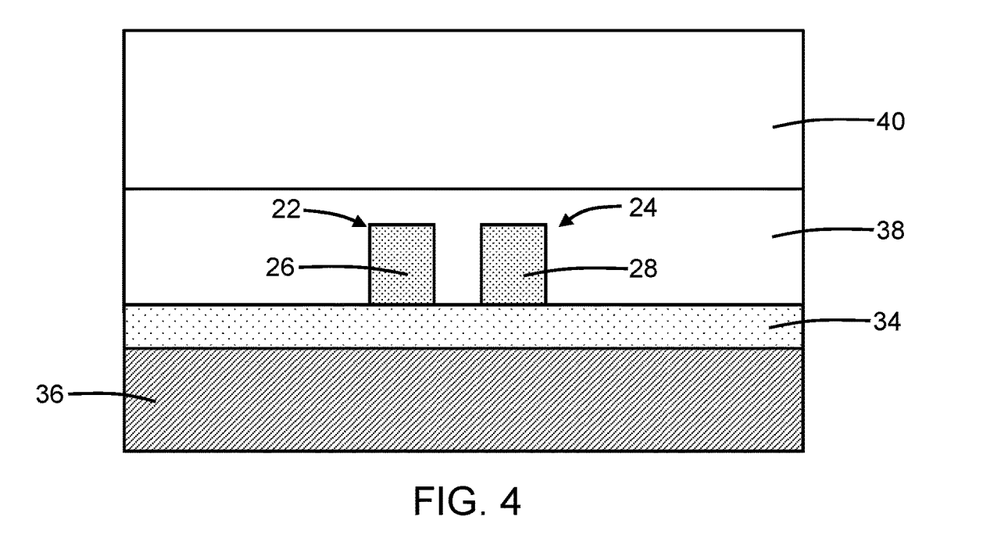
FIG. 4 is a cross-sectional view at a fabrication stage subsequent to FIG. 3.

With reference to FIG. 4 in which like reference numerals refer to like features in FIG. 3 and at a subsequent fabrication stage, a dielectric layer 38 is formed over the waveguide cores 22, 24. The dielectric layer 38 may be comprised of a dielectric material, such as silicon dioxide, that is deposited and then planarized following deposition. In an embodiment, the waveguide cores 22, 24 may be embedded in the dielectric layer 38. The dielectric material constituting the dielectric layer 38 may have a refractive index that is less than the refractive index of the material constituting the waveguide cores 22, 24.

A back-end-of-line stack 40 may be formed over the dielectric layer 38. The back-end-of-line stack 40 may include stacked dielectric layers in which each dielectric layer is comprised of a dielectric material, such as silicon dioxide, silicon nitride, tetraethylorthosilicate silicon dioxide, or fluorinated-tetraethylorthosilicate silicon dioxide.

The structure 18 may be effective to reduce the impact of reticle stitching mismatch by leveraging side-by-side tapers at the boundaries 16 of the chip regions 12 defined by different reticle images. For each structure 18, the tapered section 26 is configured to transfer light across one of the boundaries 16 to the tapered section 28. The light transfer between the tapered sections 26, 28 may be adiabatic with minimal impact on optical performance. The structure 18 may handle the transfer of light of increased optical mode size, in comparison with a conventional structure, across the boundary 16. The structure 18 may be more tolerant to misalignment in the light propagation direction, such as misalignment causing variation in the longitudinal offset between the tapered section 26 and the tapered section 28, resulting from reticle stitching.

Figure 5:
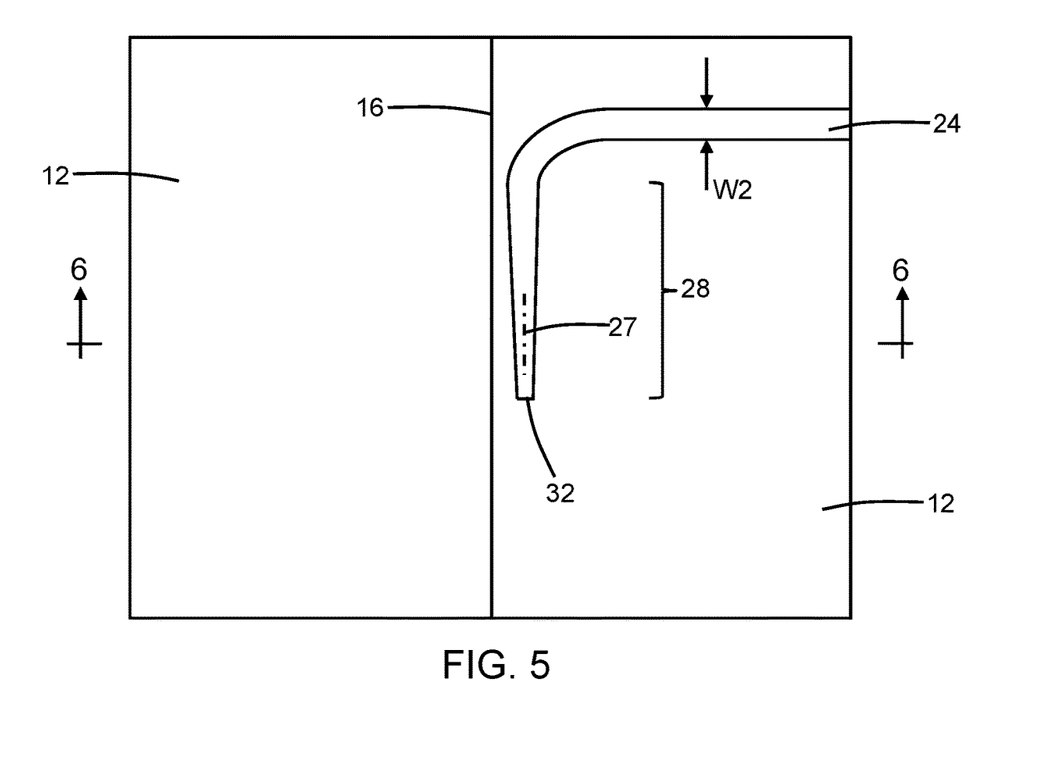
FIG. 5 is a top view of a structure in accordance with alternative embodiments of the invention.
Figure 6:
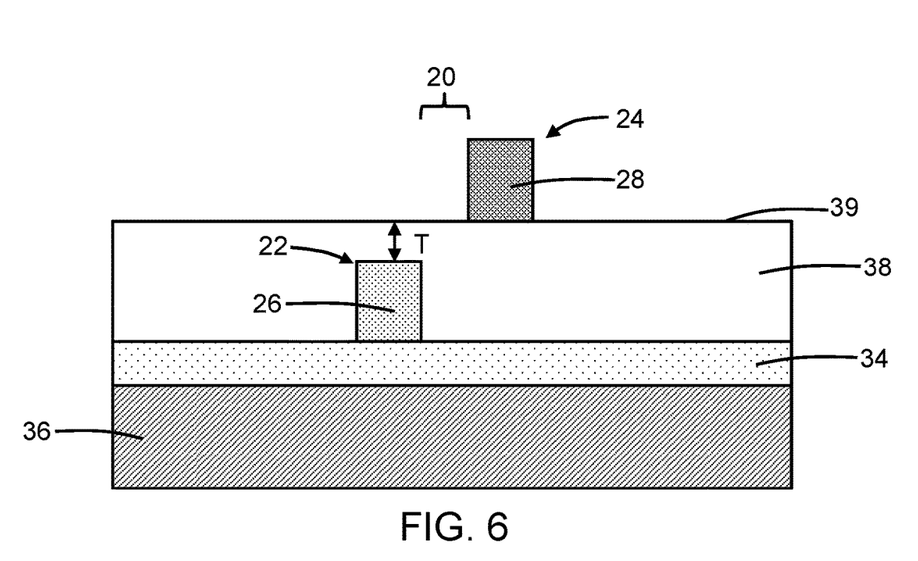
FIG. 6 is a cross-sectional view taken generally along line 6-6 in FIG. 5.

With reference to FIGS. 5, 6 and in accordance with alternative embodiments of the invention, the waveguide core 22 and the waveguide core 24 may be formed in different levels such that light is laterally and vertically transferred between the tapered sections 26, 28 at each boundary 16. In an embodiment, the waveguide core 24 including the tapered section 28 may be formed on the dielectric layer 38 such that the tapered section 28 is positioned in a vertical direction above the tapered section 26 with a lateral spacing. In particular, the waveguide core 24 may be formed on a top surface 39 of the dielectric layer 38, and the waveguide core 22 may be formed below the top surface 39 of the dielectric layer 38 and embedded in the dielectric layer 38. A thickness T of the dielectric material of the dielectric layer 38 is positioned between the waveguide core 22 and the waveguide core 24. In an embodiment, the waveguide core 22 and the waveguide core 24 may be comprised of different materials. In an embodiment, the waveguide core 22 may be comprised of silicon, and the waveguide core 24 may be comprised of silicon nitride. In an alternative embodiment, the waveguide core 22 and the waveguide core 24 may be comprised of the same material (e.g., silicon nitride).

Figure 7:
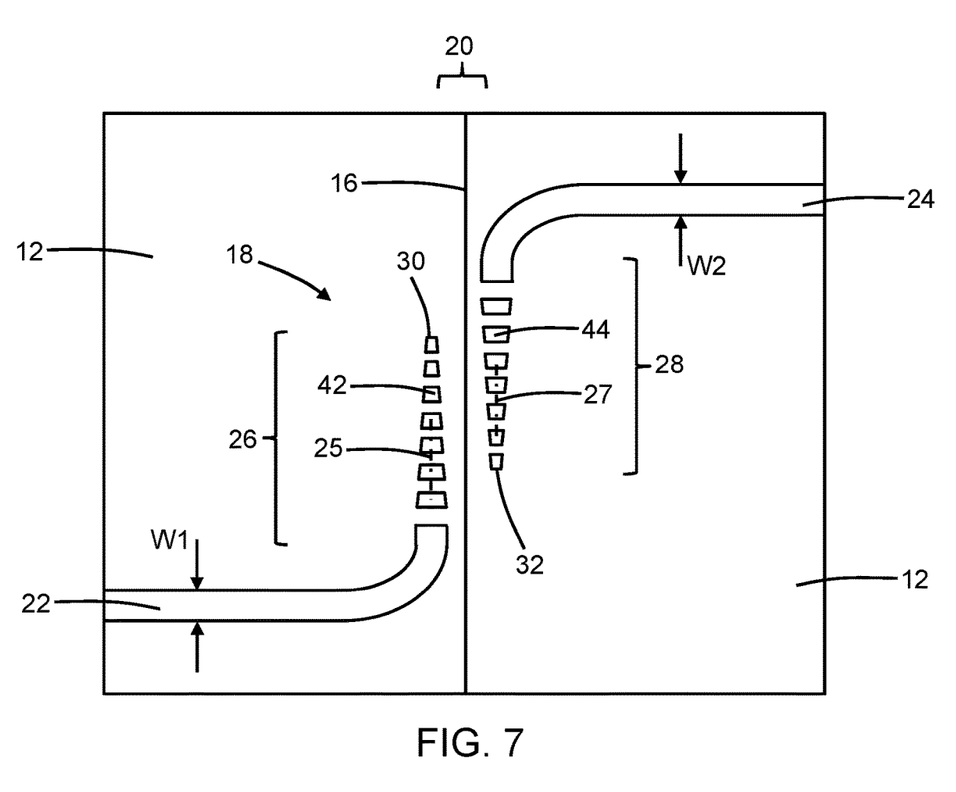
FIG. 7 is a top view of a structure in accordance with alternative embodiments of the invention.

With reference to FIG. 7 and in accordance with alternative embodiments of the invention, the tapered section 26 of the waveguide core 22 may be divided into segments 42 that are distributed in a spaced arrangement along the longitudinal axis 25, and the tapered section 28 of the waveguide core 24 may be divided into segments 44 that are distributed in a spaced arrangement along the longitudinal axis 27. In an embodiment, the pitch and duty cycle of the segments 42 and/or the segments 44 may be uniform to define a periodic arrangement. In alternative embodiments, the pitch and/or the duty cycle of the segments 42 and/or the segments 44 may be apodized (i.e., non-uniform) to define a non-periodic arrangement. The segments 42 and the segments 44 may be dimensioned and positioned at small enough pitch so as to define sub-wavelength grating-like structures.

The dielectric layer 38, which is formed over the waveguide cores 22, 24, is disposed in the gaps between adjacent pairs of the segments 42 and in the gaps between adjacent pairs of the segments 44. In an embodiment, the dielectric material of the dielectric layer 38 may fully fill the gaps. The segments 42 and the dielectric material of the dielectric layer 38 in the gaps between adjacent pairs of segments 42 may define a metamaterial structure in which the material constituting the segments 42 has a higher refractive index than the dielectric material of the dielectric layer 38. The segments 44 and the dielectric material of the dielectric layer 38 in the gaps between adjacent pairs of segments 44 may define a metamaterial structure in which the material constituting the segments 44 has a higher refractive index than the dielectric material of the dielectric layer 38. The metamaterial structures can be treated as homogeneous materials each having an effective refractive index that is intermediate between the refractive index of the material constituting the segments 42, 44 and the refractive index of the dielectric material of the dielectric layer 38.

In an alternative embodiment, the waveguide core 22 with the segmented tapered section 26 and the waveguide core 24 with the segmented tapered section 28 may be positioned in different levels (FIGS. 5, 6).

Figure 8:
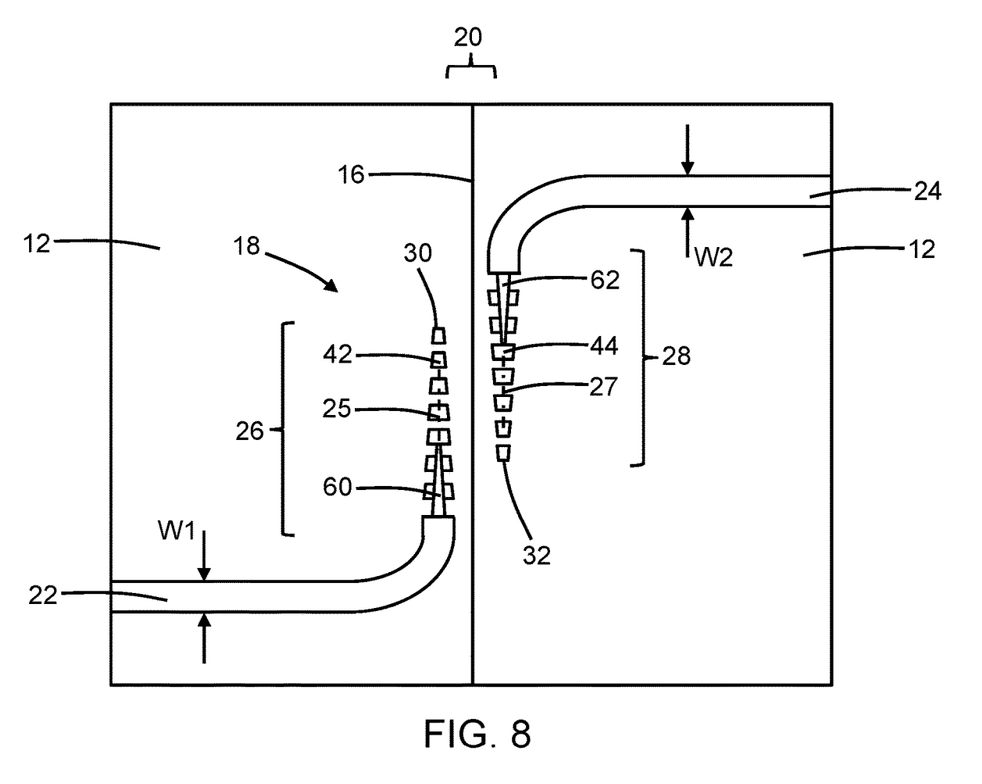
FIG. 8 is a top view of a structure in accordance with alternative embodiments of the invention.

With reference to FIG. 8 and in accordance with alternative embodiments of the invention, a rib 60 may be formed that is overlaid on the segments 42 of the tapered section 26, and another rib 62 may be formed that is overlaid on the segments 44 of the tapered section 28. In an embodiment, the rib 60 may be tapered in the same direction as the segments 42, and the rib 62 may be tapered in the same direction as the segments 44.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
a photonics chip including a first chip region, a second chip region, a first waveguide core in the first chip region, and a second waveguide core in the second chip region, the first chip region adjoining the second chip region along a boundary, the first waveguide core including a first tapered section and a first bend adjoining the first tapered section, the second waveguide core including a second tapered section adjacent to the first tapered section and a second bend adjoining the second tapered section, the first tapered section having a first longitudinal axis aligned substantially parallel to the boundary by the first bend, and the second tapered section having a second longitudinal axis aligned substantially parallel to the boundary by the second bend.

2. The structure of claim 1 wherein the first longitudinal axis of the first tapered section is aligned parallel to the boundary, and the second longitudinal axis of the second tapered section is aligned parallel to the boundary.

3. The structure of claim 1 wherein the first tapered section is separated from the second tapered section by a gap that overlaps with the boundary.

4. The structure of claim 1 wherein the first waveguide core has a first end that terminates the first tapered section, the second waveguide core has a second end that terminates the second tapered section, and the first end is offset in a longitudinal direction from the second end.

5. The structure of claim 1 wherein the first waveguide core has a first end that terminates the first tapered section, and the first tapered section has a first width dimension that decreases with decreasing distance from the first end.

6. The structure of claim 5 wherein the second waveguide core has a second end that terminates the second tapered section, and the second tapered section has a second width dimension that decreases with decreasing distance from the second end.

7. The structure of claim 6 wherein the first tapered section and the second tapered section have equal taper angles.

8. The structure of claim 1 wherein the first tapered section includes a first plurality of segments having a first spaced arrangement along the first longitudinal axis, and the second tapered section includes a second plurality of segments having a second spaced arrangement along the second longitudinal axis.

9. The structure of claim 8 wherein the first waveguide core further includes a first rib overlaid with the first plurality of segments, and the second waveguide core further includes a second rib overlaid with the second plurality of segments.

10. The structure of claim 8 wherein the first plurality of segments are separated by a first plurality of gaps, the second plurality of segments are separated by a second plurality of gaps, a dielectric material is positioned in the first plurality of gaps and the second plurality of gaps, the first plurality of segments and the second plurality of segments comprise a first material having a first dielectric constant, and the dielectric material comprises a second material having a second dielectric constant that is less than the first dielectric constant.

11. The structure of claim 10 wherein the first plurality of segments and the dielectric material define a first metamaterial structure, and the second plurality of segments and the dielectric material define a second metamaterial structure.

12. The structure of claim 1 wherein the first chip region includes a first plurality of optical components coupled to the first waveguide core, the second chip region includes a second plurality of optical components coupled to the second waveguide core, and the second plurality of optical components are identical to the first plurality of optical components.

13. The structure of claim 1 wherein the first tapered section is configured to transfer light from the first waveguide core to the second tapered section of the second waveguide core at the boundary.

14. The structure of claim 1 wherein the first tapered section is solid, and the second tapered section is solid.

15. The structure of claim 1 wherein the first waveguide core and the second waveguide core comprise a same material.

16. The structure of claim 1 wherein the first waveguide core comprises a first material, and the second waveguide core comprises a second material that is different from the first material.

17. The structure of claim 16 wherein the first material is silicon, and the second material is silicon nitride.

18. The structure of claim 16 wherein the photonics chip includes a dielectric layer, the first waveguide core is embedded in the dielectric layer, and the second waveguide core is positioned on the dielectric layer.

19. A method comprising:
forming a first chip region of a photonics chip, wherein the first chip region includes a first waveguide core, and the first waveguide core includes a first tapered section and a first bend adjoining the first tapered section; and
forming a second chip region of the photonics chip that adjoins the first chip region of the photonics chip along a boundary, wherein the second chip region includes a second waveguide core having a second tapered section positioned adjacent to the first tapered section at the boundary and a second bend adjoining the second tapered section, the first tapered section has a first longitudinal axis aligned substantially parallel to the boundary by the first bend, and the second tapered section has a second longitudinal axis aligned substantially parallel to the boundary by the second bend.

20. The method of claim 19 wherein the first chip region and the second chip region comprise respective reticle images that are lithographically replicated over an area of the photonics chip.

* * * * *